US007873209B2

(12) United States Patent
Deng et al.

(10) Patent No.: US 7,873,209 B2
(45) Date of Patent: Jan. 18, 2011

(54) SEGMENT-DISCRIMINATING MINIMUM CLASSIFICATION ERROR PATTERN RECOGNITION

(75) Inventors: Li Deng, Sammamish, WA (US);
Xiaodong He, Issaquah, WA (US);
Qiang Fu, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 1005 days.

(21) Appl. No.: 11/700,664

(22) Filed: Jan. 31, 2007

(65) Prior Publication Data

US 2008/0181489 A1     Jul. 31, 2008

(51) Int. Cl.
*G06K 9/00*     (2006.01)
*G10L 15/00*    (2006.01)

(52) U.S. Cl. ........................ 382/159; 382/181; 704/231
(58) Field of Classification Search ................ 382/159, 382/173, 181, 209, 218, 224, 228, 229; 704/231, 704/235, 244, 251, E15.028
See application file for complete search history.

(56) References Cited

U.S. PATENT DOCUMENTS

| 5,742,928 | A | 4/1998 | Suzuki ........................ 704/239 |
| 5,835,890 | A | 11/1998 | Matsui et al. ............... 704/255 |
| 5,970,239 | A | 10/1999 | Bahl et al. ............. 395/500.23 |
| 6,076,058 | A | 6/2000 | Chengalvarayan .......... 704/256 |
| 6,112,175 | A | 8/2000 | Chengalvarayan .......... 704/256 |
| 6,125,345 | A | 9/2000 | Modi et al. ................. 704/240 |
| 6,292,776 | B1 | 9/2001 | Chengalvarayan .......... 704/219 |
| 6,751,590 | B1 | 6/2004 | Chaudhari et al. .......... 704/246 |
| 7,216,079 | B1 * | 5/2007 | Barnard et al. .............. 704/244 |
| 7,574,358 | B2 * | 8/2009 | Deligne et al. .............. 704/243 |
| 2004/0064315 | A1 * | 4/2004 | Deisher et al. .............. 704/233 |
| 2005/0182628 | A1 * | 8/2005 | Choi .......................... 704/252 |

OTHER PUBLICATIONS

"An Overview of Discriminative Training for Speech Recognition", Keith Vertanen, University of Cambridge, 2004.
"Towards robust person recognition on handheld devices using face and speaker identification technologies," T. Hazen, E. Weinstein, and A. Park, in Proc. of Int. 7 Conf. on Multimodal Interfaces, Vancouver, Canada, Nov. 2003.
"Phonetic Classification on Wide-Band and Telephone Quality Speech", by Benjamin Chigier, Human Language Technology Conference, pp. 291-295, 1992, ISBN: 1-55860-272-0.
"Discriminative training for large vocabulary speech recognition using Minimum Classification Error", by Erik McDermott et al., IEEE Transactions on Audio, Speech, and Language Processing, vol. 15, No. 1, 2007, pp. 203-223.

* cited by examiner

*Primary Examiner*—Daniel G Mariam
(74) *Attorney, Agent, or Firm*—Joseph R. Kelly; Westman, Champlin & Kelly, P.A.

(57) ABSTRACT

Pattern model parameters are updated using update equations based on competing patterns that are identical to a reference pattern except for one segment at a time that is replaced with a competing segment. This allows pattern recognition parameters to be tuned one segment at a time, rather than have to try to model distinguishing features of the correct pattern model as a whole, according to an illustrative embodiment. A reference pattern and competing patterns are divided into pattern segments. A set of training patterns are generated by replacing one of the pattern segments in the reference pattern with a corresponding competing pattern segment. For each of the training patterns, a pattern recognition model is applied to evaluate a relative degree of correspondence of the reference pattern with the pattern signal compared to a degree of correspondence of the training patterns with the pattern signal.

20 Claims, 5 Drawing Sheets

SEGMENT-DISCRIMINATING MINIMUM CLASSIFICATION ERROR PATTERN RECOGNITION

BACKGROUND

Pattern recognition for tasks such as automatic speech recognition has been an active field of research. One well established framework for a variety of pattern recognition applications is based on pattern models known as Hidden Markov Models (HMMs), which provide state space models with latent variables describing interconnected states where each state is represented by a Gaussian distribution or by a mixture of Gaussians, for modeling data with sequential patterns. Units of a speech signal, such as phones, may be associated with one or more states of the pattern models. Typically, the pattern models incorporate classification parameters that must be trained to identify the pattern that correctly matches an input signal, such as by revising the means and variances of the distributions for the pattern models. One technique for training HMM parameters is to use discriminative training, in which the goal is to set the HMM parameters so that the HMM is able to discriminate between a correct pattern and one or more relatively similar but incorrect patterns.

One specific form of discriminative training is known as minimum classification error (MCE) training. In MCE training, the HMM parameters are trained by optimizing an objective function that is closely related to classification errors, where a classification error is the selection of an incorrect word sequence instead of a correct word sequence. Another form of discriminative training is known as maximization of mutual information (MMI). Under MMI, an objective function related to the mutual information is optimized using one of a set of optimization techniques. One of these techniques is known as Growth Transformation (GT) or Extended Baum-Welch (EBW). However, it remains a challenge to effectively model distinguishing characteristics of a correct target pattern from the many possible erroneous competing possibilities.

The discussion above is merely provided for general background information and is not intended to be used as an aid in determining the scope of the claimed subject matter.

SUMMARY

Pattern model parameters are updated using update equations based on competing patterns that are identical to a reference pattern except for one segment at a time that is replaced with a competing segment. This allows pattern recognition parameters to be tuned one segment at a time, rather than have to try to model distinguishing features of the correct pattern model as a whole, according to an illustrative embodiment. A reference pattern corresponding to a pattern signal and one or more competing patterns are provided. The reference pattern and the one or more competing patterns are divided into pattern segments. The pattern segments of the competing patterns are identified with corresponding pattern segments of the reference pattern. A set of training patterns are generated by replacing one of the pattern segments in the reference pattern with a corresponding competing pattern segment, which may be selected from one of the competing patterns, or from a pre-defined confusion pattern set. For each of the training patterns, a pattern recognition model is applied to evaluate a relative degree of correspondence of the reference pattern with the pattern signal compared to a degree of correspondence of the training patterns with the pattern signal. The pattern recognition model incorporates correspondence parameters to features of the reference pattern and the training patterns. The correspondence parameters are revised to increase the relative degree of correspondence of the reference pattern with the pattern signal compared to a degree of correspondence of the training patterns with the pattern signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
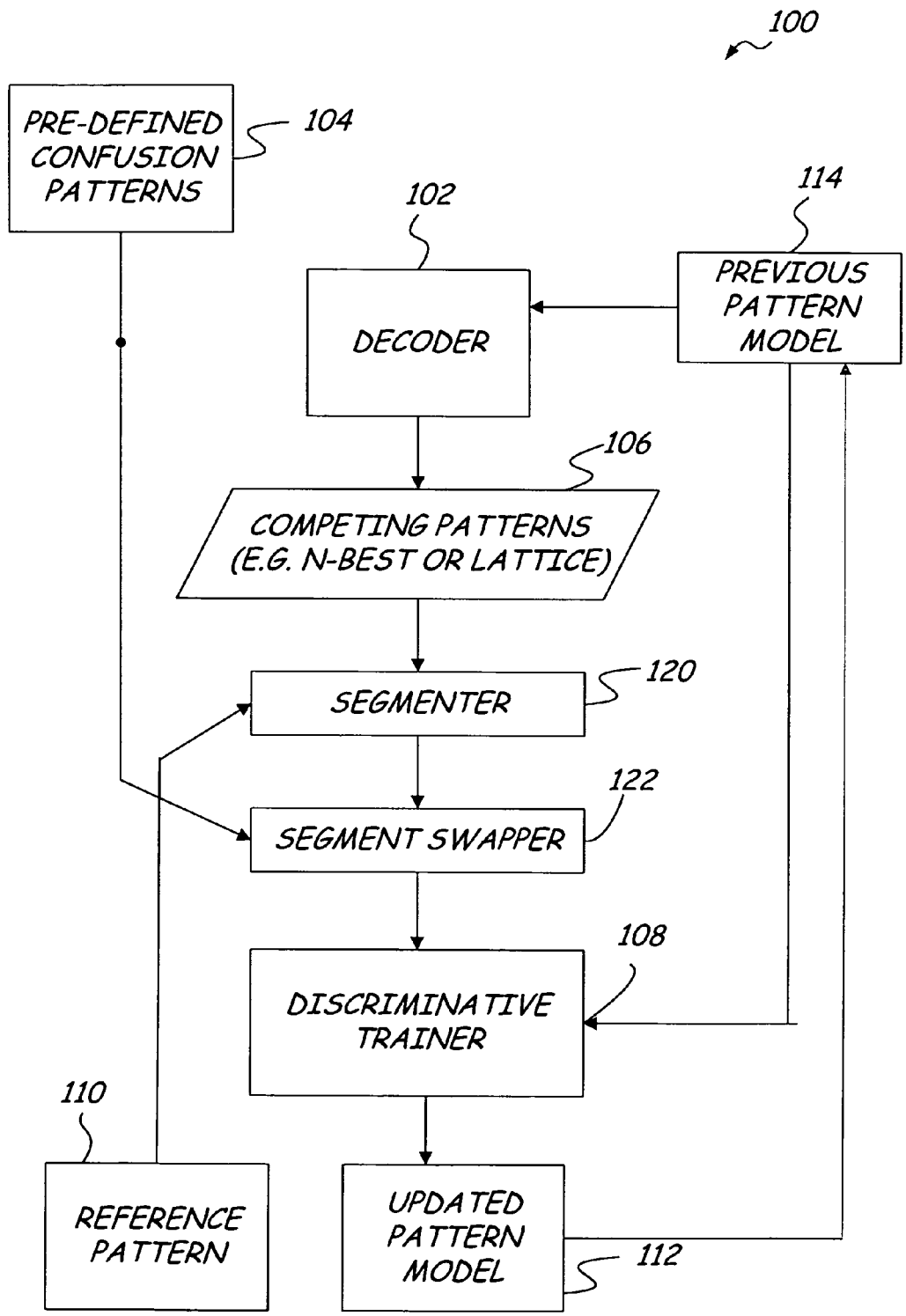
FIG. 1 illustrates a block diagram of a discriminative training system, according to an illustrative embodiment.
Figure 2:
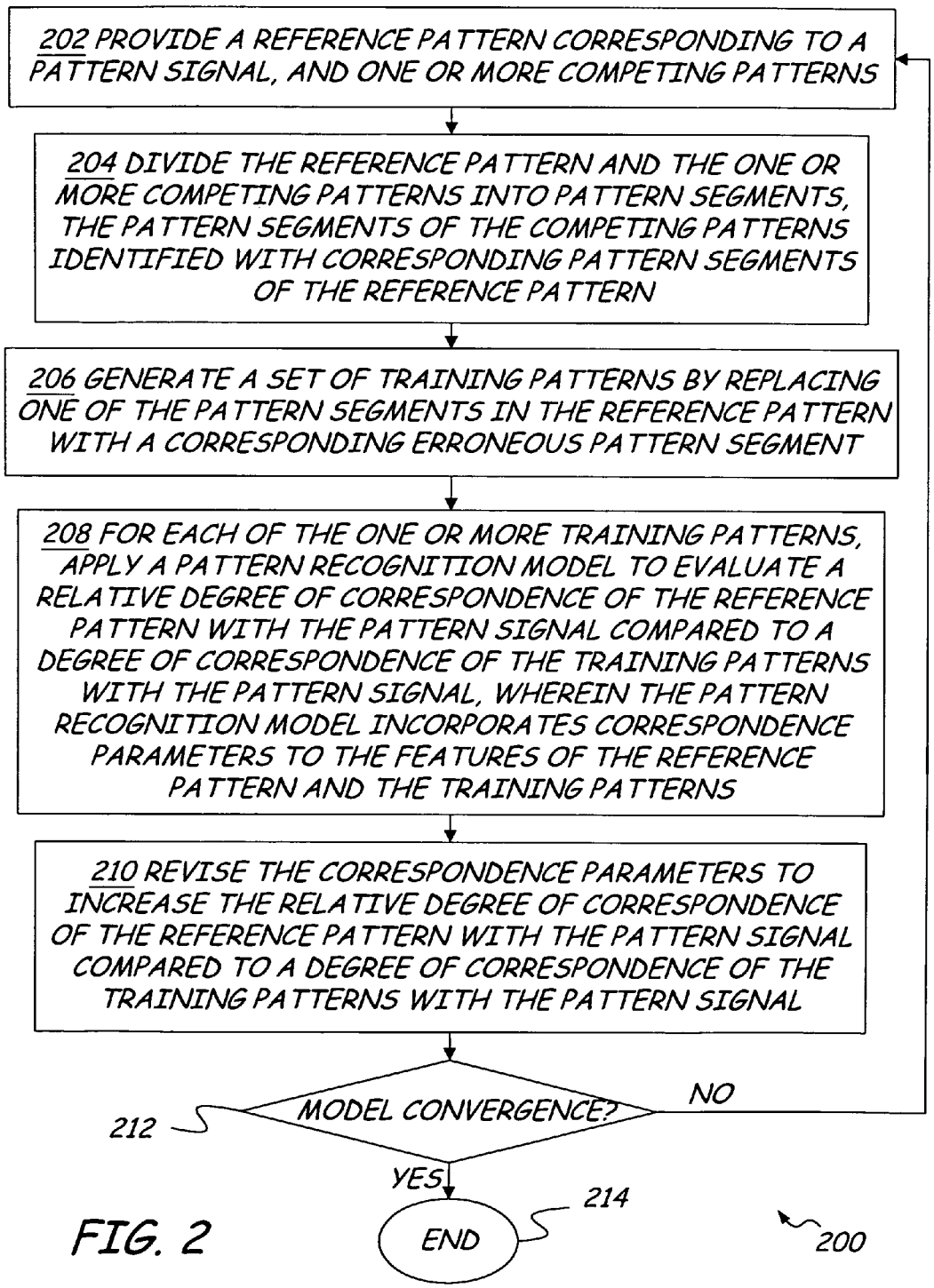
FIG. 2 is a flow diagram of a method of discriminative training, according to an illustrative embodiment.

FIG. 1 provides a block diagram of a general system for performing discriminative training to train a set of acoustic models. FIG. 2 provides a flow diagram of a method 200 for discriminative training, in accordance with the discriminative training system 100 of FIG. 1.

Method 200 includes steps 202-214, according to one illustrative embodiment. Step 202 includes providing a reference pattern corresponding to a pattern signal, and one or more competing patterns. The competing patterns may be provided by any appropriate process, such as, in the case of an automatic speech recognition application of pattern recognition, by an N-Best word sequence, a lattice of word sequences, outputs from an automatic speech recognition tool processing the pattern signal, or a pre-defined segment confusion pattern set generated with reference to the pattern signal, according to a variety of illustrative examples. Several examples are provided herein that deal with automatic speech recognition as an illustrative example of pattern recognition for various illustrative embodiments. A lattice of word sequences may be a compact representation of N-best word sequences because it can use a single word arc to represent the occurrence of a word in multiple word sequences. A pattern recognition lattice may include a network of arcs that correspond to potential pattern segments. Arcs that correspond to potential pattern segments may be used to generate the competing pattern segments. Evaluating a relative degree of correspondence of the reference pattern with the pattern signal compared to a degree of correspondence of the training patterns with the pattern signal may include forming a state lattice and using a forward-backward algorithm. The state lattice may include pattern model states from the beginning of a subject arc from among the arcs to the end of the subject arc. The forward-backward algorithm may include determining a forward path score from the beginning of the subject arc to a selected state at a selected point in the state lattice, and a backward path score from the end of the subject arc to the selected state at the selected point in the state lattice, and using the forward path score and the backward path score to evaluate a relative degree of correspondence with the pattern signal of the selected state at the selected point.

Step 204 includes dividing the reference pattern and the one or more competing patterns into pattern segments, the pattern segments of the competing patterns identified with corresponding pattern segments of the reference pattern. Step 206 includes generating a set of training patterns by replacing one of the pattern segments in the reference pattern with a corresponding erroneous pattern segment from one of the competing patterns, or from a pre-defined confusion pattern set. Step 208 includes for each of the one or more training patterns, applying a pattern recognition model to evaluate a relative degree of correspondence of the reference pattern with the pattern signal compared to a degree of correspondence of the training patterns with the pattern signal, wherein the pattern recognition model incorporates correspondence parameters to features of the reference pattern and the training patterns. The correspondence parameters may be derived by any appropriate means, such as by a Maximum Mutual Information (MMI) process, for example.

The parameters may thereafter be revised iteratively according to a segment-discriminating minimum classification error training process, such as that depicted subsequently for step 210. Step 210 includes revising the correspondence parameters to increase the relative degree of correspondence of the reference pattern with the pattern signal compared to a degree of correspondence of the training patterns with the pattern signal. The correspondence parameters may describe the probability of matching the pattern signal, in this illustrative embodiment.

As depicted in system 100 of FIG. 1, reference pattern 110 and competing patterns 106 may be provided to a segmenter 120. The competing patterns 106 may be derived from the recognizer i.e. decoder 102 which produces them in the form of whole competing strings according to a lattice of pattern segment sequences such as word sequences, for example. The pattern model obtained via the immediate previous iteration, 114, may be used for this. The erroneous patterns and reference pattern are segmented into short segments, and then segment swapper 122 iteratively replaces one segment at a time from the reference pattern with an erroneous segment from one of the competing patterns, before providing the segments thus hybridized as training patterns to discriminative trainer 108. A set of pre-defined confusion patterns 104, e.g., can be derived by applying the baseline pattern model to the training set, and also be provided to segment swapper 122. So, if no suitable erroneous segment from competing patterns 106 can be found for a reference segment from reference pattern 110, an erroneous segment is selected from pre-defined confusion pattern set 104.

Discriminative trainer 108 generates revisions to the classification parameters of the pattern model, and provides these to the updated pattern model 112. This process of revising the classification parameters can be iteratively rerun, as indicated in system 100, and in FIG. 2 at decision node 212, which evaluates whether the model is converging, which it is expected to do as the classification parameters are refined. Once the classification parameters have converged to a sufficient degree, according to specifications provided to the training process, the iterative revisions to the classification parameters may be made to finalize as at end node 214.

Figure 3:
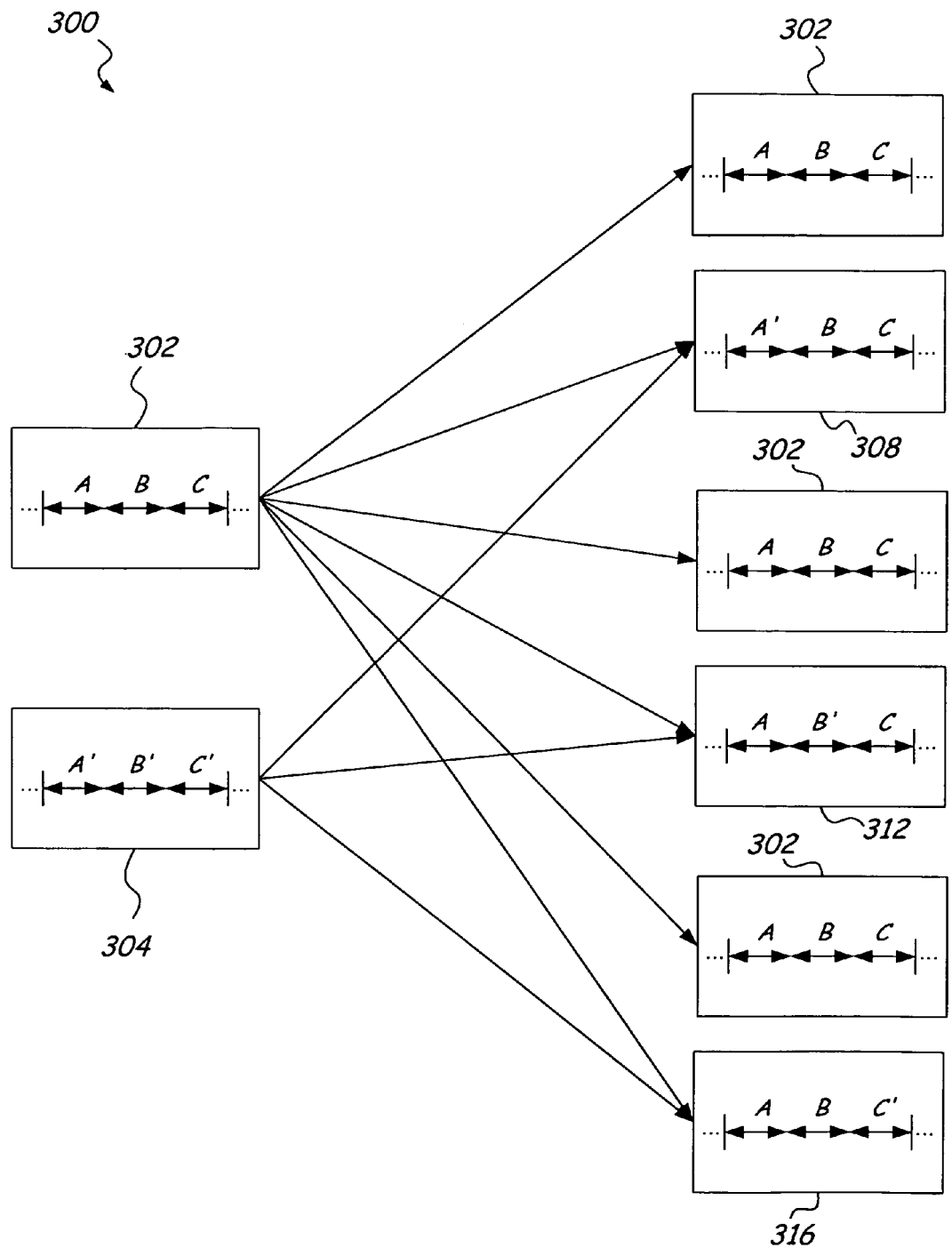
FIG. 3 illustrates a block diagram of generating training patterns for discriminative training of a reference pattern, according to an illustrative embodiment.

The action of segment swapper 122 to create the training patterns is further depicted in simplified form in the block diagram of pattern segmentation system 300 in FIG. 3. Reference pattern 302 is simplified to the degree that it is divided into only three pattern segments, labeled A, B, and C. According to one illustrative embodiment, pattern 302 may be a spoken utterance submitted as a speech input to an automatic speech recognition embodiment, for example, and the pattern segments A, B, and C may represent individual phones of the spoken utterance, i.e. very short segments of the auditory signal. The pattern segments may also represent phonemes of the spoken utterance, or syllables thereof, or tokens, or entire words, or lexical items, phrases, or larger segments of speech, for example. Pattern 304 represents a competing pattern, comprising segments labeled with primes, i.e. A', B', and C', to indicate how these segments are identified with corresponding pattern segments A, B, and C of the reference pattern 302.

Segment swapper 122 then replaces one segment at a time from reference pattern 302 with one of the corresponding erroneous segments from competing pattern 304, to generate training patterns 308, 312, and 316, each of which is identical to reference pattern 302 except for one segment swapped out and replaced with a segment from competing pattern 304. Reference pattern 302 may then be compared to each of training patterns 308, 312, and 316, for the pattern recognition model to then evaluate the relative degree of correspondence of the reference pattern 302 with that of the training patterns 308, 312, and 316. The pattern model parameters may then be revised to increase the correspondence between the correct reference pattern 302 in ways that do not increase the correspondence of the training patterns 308, 312, and 316 to the pattern signal, and also to decrease the correspondence between the training patterns 308, 312, and 316 and the pattern signal. The boundaries, or time marks, of A and A' are not necessarily the same, i.e., the temporal boundary between A and B in ABC may be different from the temporal boundary between A' and B in A'BC. Moreover, comparing reference pattern 302 vs. training pattern 308 illustrates that the pair of whole pattern sequences ABC vs. A'BC, rather than merely the isolated fragments of A' vs. A, are considered in the comparison and model parameter revision. While FIG. 3 shows a simplified depiction of comparing the models, a much larger number of pattern segments may be used in different embodiments.

By performing these revisions with just one segment revised at a time, system 300 may fine-tune the classification parameters as applied to each segment, of arbitrarily small size, of the reference pattern, achieving a high resolution and high precision of tuning for the classification parameters, instead of trying to revise the classification parameters according to features and correspondences of the patterns on the gross scale of the patterns as a whole.

When the model parameters of updated pattern models 112 have converged, as indicated at node 212, the process ends at step 214 and the updated pattern models 112 may be provided as the final pattern recognition models, which may be used for a pattern recognition application such as speech recognition.

Illustrative steps that may be applied with the above system are provided in greater detail as follows, for one illustrative embodiment with reference to speech recognition. In the following, for pattern signal r, e.g. a spoken utterance, $S_r$ denotes the reference pattern, e.g. a word sequence, reflecting the true correspondence with pattern signal r; "$s_r$, $s_r \neq S_r$," denotes a competing pattern, and $s_r$ without special annotation denotes any possible pattern sequence, which can be either the reference pattern $S_r$ or any competing pattern.

The minimum classification error discriminative training used in step 208 above may be based on the following misclassification measure:

$$d_r(X_r, \Lambda) = -\log p_\Lambda(X_r, S_r) + \log \sum_{s_r, s_r \neq S_r} w(s_r) \cdot p_\Lambda(X_r, s_r) \quad \text{(EQ. 1)}$$

where $d_r(X_r,\Lambda)$ is the misclassification measure for utterance r based on a sequence of T feature vectors, $X_r = [x_1 \ldots x_t \ldots x_T]$, which represents the utterance and based on acoustic model parameters $\Lambda$, $p_\Lambda(X_r, S_r)$ is the joint probability of utterance feature vectors $X_r$ and true transcript $S_r$ based on acoustic model parameters $\Lambda$, $p_\Lambda(X_r, s_r)$ given the restriction $s_r \neq S_r$ is the joint probability of utterance feature vectors $X_r$ and a competitor pattern sequence $s_r$, $w(s_r)$ given the restriction $s_r \neq S_r$, is a non-negative weighting factor for competitor pattern sequence $s_r$, and the summation in the second term on the right is taken over all competitor pattern sequences that are not the true transcript. In the following sections, for the true transcript $S_r$, a value of 1 is assigned to $w(s_r)$ where $s_r = S_r$. The selection of the competing pattern sequence $s_r$ provides an advantageous new basis for fine-tuning the selection method.

Using the misclassification measure of EQ. 1, a loss function for an N-Best version of MCE becomes:

$$l_r(d_r(X_r, \Lambda)) = \frac{\sum_{s_r, s_r \neq S_r} w(s_r) p_\Lambda(X_r, s_r)}{\sum_{s_r} w(s_r) p_\Lambda(X_r, s_r)} \quad \text{(EQ. 2)}$$

where the loss function $l_r(d_r(X_r,\Lambda))$ is for a single utterance r. The loss function has a value between zero and one and tends to have values that are either very close to zero or very close to one.

The loss function over the entire set of R training utterances becomes:

$$L_{P-MCE}(\Lambda) = \frac{1}{R} \sum_{r=1}^{R} l(d_r(X_r, \Lambda)) \quad \text{(EQ. 3)}$$

where $L(\Lambda)$ has values between zero and R.

Minimizing the loss function of EQ. 3 is equivalent to maximizing the following objective function:

$$Q(\Lambda) = R - L_{P-MCE}(\Lambda) = \sum_{r=1}^{R} \frac{p(X_r, S_r | \Lambda)}{p(X_r, S_{r,1} | \Lambda) + p(X_r, S_r | \Lambda)} \quad \text{(EQ. 4)}$$

The posterior probability of being in state m in the corresponding HMM at time t for utterance r for word string $s_r$ can be defined as follows:

$$\gamma_{m,r,s_r}(t) = p(q_{r,t} = m | X_r, s_r, \Lambda') \quad \text{(EQ. 5)}$$

$$\Delta\gamma_{m,r}(t) = p(S_r | X_r, \Lambda') p(s_{r,1} | X_r, \Lambda')(\gamma_{m,r,S_r}(t) - \gamma_{m,r,s_{r,1}}(t)) \quad \text{(EQ. 6)}$$

Then, the classification parameters can be updated in accordance with the above methods using the following equations ((7) and (8)), which guarantee that the objective function of EQ. 4 over the entire training set will monotonically increase:

$$\mu_m = \frac{\sum_r \sum_t \Delta\gamma_{m,r}(t) x_{r,t} + D_m \mu'_m}{\sum_r \sum_t \Delta\gamma_{m,r}(t) + D_m} \quad \text{(EQ. 7)}$$

$$\Sigma_m = \frac{\sum_r \sum_t [\Delta\gamma_{m,r}(t)(x_{r,t} - \mu_m)(x_{r,t} - \mu_m)^T] + D_m \sum'_m + D_m(\mu_m - \mu'_m)(\mu_m - \mu'_m)^T}{\sum_r \sum_t \Delta\gamma_{m,r}(t) + D_m} \quad \text{(EQ. 8)}$$

where $$D_m = E \sum_{r=1}^{R} p(S_r | X_r, \Lambda') \begin{bmatrix} p(S_r | X_r, \Lambda') \sum_t \gamma_{m,r,S_r}(t) + \\ p(S_r | X_r, \Lambda') \sum_t \gamma_{m,r,s_{r,1}}(t) \end{bmatrix} \quad \text{(EQ. 9)}$$

and where μ' (the mean) and Σ' (the covariance matrix) are the HMM parameters from the previous iteration of the algorithm, where the initial HMM parameters are from the maximum-likelihood training.

Figure 4:
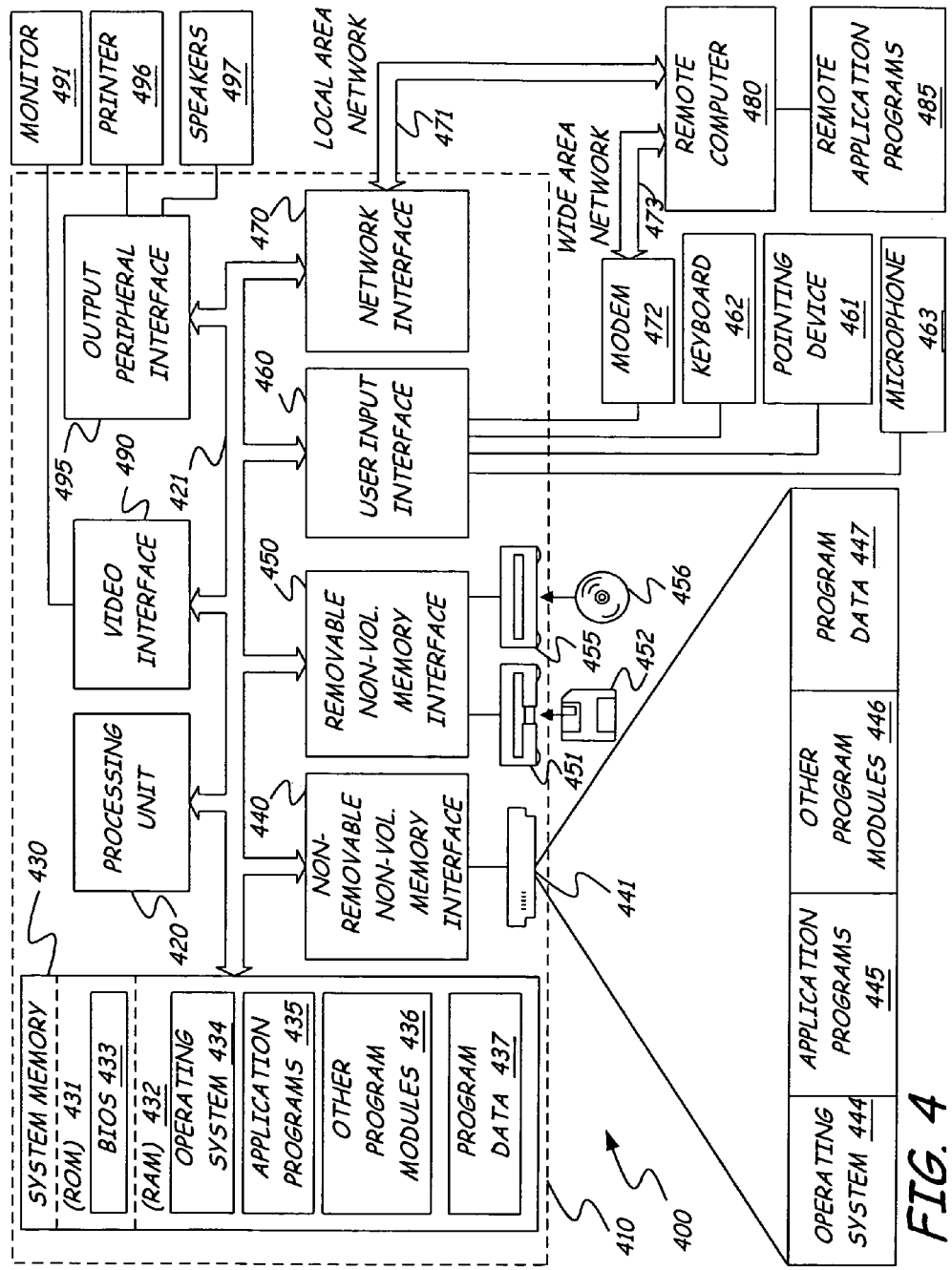
FIG. 4 is a block diagram of a general computing environment in which some embodiments may be practiced, according to an illustrative embodiment.

FIG. 4 illustrates an example of a suitable computing system environment 400 on which various embodiments may be implemented. For example, various embodiments may be implemented as software applications, modules, or other forms of instructions that are executable by computing system environment 400 and that configure computing system environment 400 to perform various tasks or methods involved in different embodiments. A software application or module associated with an illustrative implementation of a dynamic projected user interface may be developed in any of a variety of programming or scripting languages or environments. For example, it may be written in C#, F#, C++, C, Pascal, Visual Basic, Java, JavaScript, Delphi, Eiffel, Nemerle, Perl, PHP, Python, Ruby, Visual FoxPro, Lua, or any other programming language. It is also envisioned that new programming languages and other forms of creating executable instructions will continue to be developed, in which further embodiments may readily be developed.

Computing system environment 400 as depicted in FIG. 4 is only one example of a suitable computing environment for implementing various embodiments, and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 4, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program-modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Figure 5:
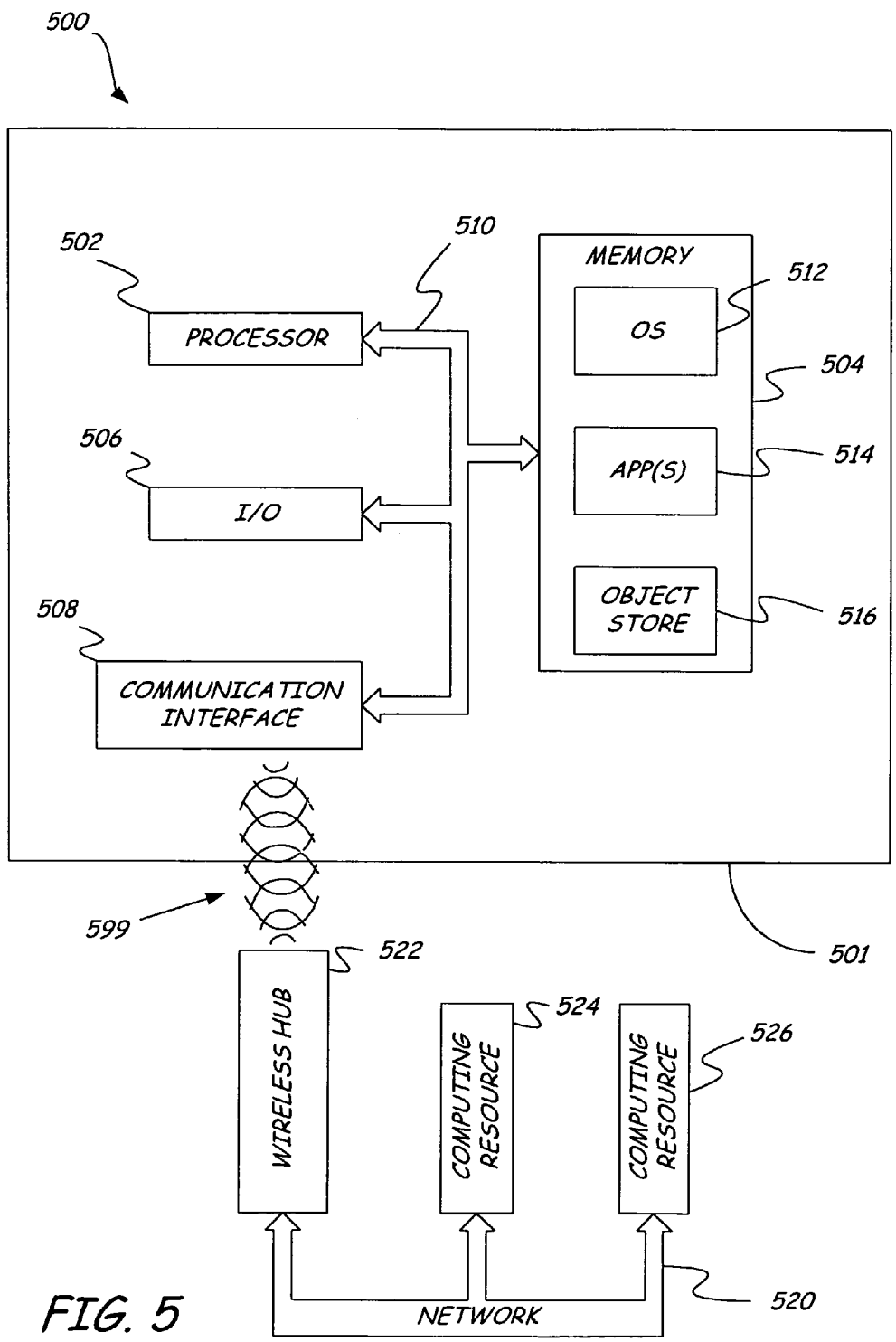
FIG. 5 is a block diagram of a computing environment in which some embodiments may be practiced, according to another illustrative embodiment.

FIG. 5 depicts a block diagram of a general mobile computing environment, comprising a mobile computing device and a medium, readable by the mobile computing device and comprising executable instructions that are executable by the mobile computing device, according to another illustrative embodiment. FIG. 5 depicts a block diagram of a mobile computing system 500 including mobile device 501, according to an illustrative embodiment. Mobile device 501 includes a microprocessor 502, memory 504, input/output (I/O) components 506, and a communication interface 508 for communicating with remote computers or other mobile devices. In one embodiment, the afore-mentioned components are coupled for communication with one another over a suitable bus 510.

Memory 504 is implemented as non-volatile electronic memory such as random access memory (RAM) with a battery back-up module (not shown) such that information stored in memory 504 is not lost when the general power to mobile device 500 is shut down. A portion of memory 504 is illustratively allocated as addressable memory for program execution, while another portion of memory 504 is illustratively used for storage, such as to simulate storage on a disk drive.

Memory 504 includes an operating system 512, application programs 514 as well as an object store 516. During operation, operating system 512 is illustratively executed by processor 502 from memory 504. Operating system 512, in one illustrative embodiment, is a WINDOWS® CE brand operating system commercially available from Microsoft Corporation. Operating system 512 is illustratively designed for mobile devices, and implements database features that can be utilized by applications 514 through a set of exposed application programming interfaces and methods. The objects in object store 516 are maintained by applications 514 and operating system 512, at least partially in response to calls to the exposed application programming interfaces and methods.

Communication interface 508 represents numerous devices and technologies that allow mobile device 500 to send and receive information. The devices include wired and wireless modems, satellite receivers and broadcast tuners to name a few. Mobile device 500 can also be directly connected to a computer to exchange data therewith. In such cases, communication interface 508 can be an infrared transceiver or a serial or parallel communication connection, all of which are capable of transmitting streaming information.

Input/output components 506 include a variety of input devices such as a touch-sensitive screen, buttons, rollers, and a microphone as well as a variety of output devices including an audio generator, a vibrating device, and a display. The devices listed above are by way of example and need not all be present on mobile device 500. In addition, other input/output devices may be attached to or found with mobile device 500.

Mobile computing system 500 also includes network 520. Mobile computing device 501 is illustratively in wireless communication with network 520—which may be the Internet, a wide area network, or a local area network, for example—by sending and receiving electromagnetic signals 599 of a suitable protocol between communication interface 508 and wireless interface 522. Wireless interface 522 may be a wireless hub or cellular antenna, for example, or any other signal interface. Wireless interface 522 in turn provides access via network 520 to a wide array of additional computing resources, illustratively represented by computing resources 524 and 526. Naturally, any number of computing devices in any locations may be in communicative connection with network 520. Computing device 501 is enabled to make use of executable instructions stored on the media of memory component 504, such as executable instructions that enable computing device 501 to implement various functions of pattern recognition parameter training, in an illustrative embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A method performed by a computer with a processor, comprising:
   providing a reference pattern corresponding to a pattern signal, and one or more competing patterns;
   dividing the reference pattern and the one or more competing patterns into pattern segments, the pattern segments of the competing patterns identified with corresponding pattern segments of the reference pattern;
   generating, with the processor, a set of training patterns by replacing one of the pattern segments in the reference pattern with a corresponding competing pattern segment from one of the competing patterns or from a pre-defined confusion pattern;
   for each of the one or more training patterns, applying, with the processor, a pattern recognition model to evaluate a relative degree of correspondence of the reference pattern with the pattern signal compared to a degree of correspondence of the training patterns with the pattern signal, wherein the pattern recognition model incorporates correspondence parameters to features of the reference pattern and the training patterns; and
   revising, with the processor, the correspondence parameters to increase the relative degree of correspondence of the reference pattern with the pattern signal compared to a degree of correspondence of the training patterns with the pattern signal.

2. The method of claim 1, further comprising iteratively applying the pattern recognition model with the revised correspondence parameters and further revising the correspondence parameters to further increase the relative degree of correspondence of the reference pattern with the pattern signal compared to a degree of correspondence of the training patterns with the pattern signal.

3. The method of claim 1, wherein providing the competing pattern segments comprises generating a pattern recognition lattice comprising a network of arcs that correspond to potential pattern segments, and combining one or more of the arcs that correspond to potential pattern segments to generate the competing pattern segments.

4. The method of claim 3, wherein evaluating a relative degree of correspondence of the reference pattern with the pattern signal compared to a degree of correspondence of the training patterns with the pattern signal, comprises:
forming a state lattice of pattern model states from the beginning of a subject arc from among the arcs to the end of the subject arc;
determining a forward path score from the beginning of the subject arc to a selected state at a selected point in the state lattice, and a backward path score from the end of the subject arc to the selected state at the selected point in the state lattice; and
using the forward path score and the backward path score to evaluate a relative degree of correspondence with the pattern signal of the selected state at the selected point.

5. The method of claim 1, wherein providing the competing pattern segments comprises selecting outputs from an automatic speech recognition tool processing the pattern signal.

6. The method of claim 1, wherein providing the competing pattern segments comprises selecting segments from a pattern segment confusion set generated with reference to the pattern signal.

7. The method of claim 1, wherein the correspondence parameters comprise feature weights applied to feature vectors of the reference pattern and the competing patterns.

8. The method of claim 1, wherein the pattern signal comprises an acoustic signal, and the reference pattern and the competing patterns comprise representations of speech indicated to potentially match content of the acoustic signal.

9. The method of claim 8, wherein the reference pattern and the one or more competing patterns comprise word sequences.

10. The method of claim 9, wherein the pattern segments into which the reference pattern and the one or more competing patterns are divided into are indicated to correspond to phones.

11. The method of claim 9, wherein the pattern segments into which the reference pattern and the one or more competing patterns are divided into are indicated to correspond to syllables.

12. The method of claim 9, wherein the pattern segments into which the reference pattern and the one or more competing patterns are divided into are indicated to correspond to tokens.

13. The method of claim 9, wherein the pattern segments into which the reference pattern and the one or more competing patterns are divided into are indicated to correspond to words.

14. The method of claim 1, further comprising applying the pattern recognition model incorporating the revised correspondence parameters to new pattern signal inputs to identify patterns in the pattern signal inputs.

15. The method of claim 14, wherein the pattern recognition model comprises a model for automatic speech recognition that is applied to new speech inputs, and wherein identifying patterns in the pattern signal inputs comprises generating sequences of words that correspond to the speech inputs.

16. The method of claim 15, further comprising indexing the speech inputs with reference to the sequences of words that correspond to the speech inputs.

17. The method of claim 1, wherein the parameters are defined in accordance with a hidden Markov model.

18. The method of claim 1, wherein revising the correspondence parameters to increase the relative degree of correspondence of the reference pattern with the pattern signal compared to the degree of correspondence of the training patterns with the pattern signal, comprises increasing a probability of a pattern segment of the reference pattern having a hidden Markov model state corresponding to the pattern signal at a corresponding time.

19. A non-transitory computer readable medium comprising instructions that are readable and executable by a computing system, wherein the instructions configure the computing system to train an automatic speech recognition system, comprising configuring the computing system to:
use a speech lattice to determine language model parameters for matching acoustic signals to word sequences;
define a speech recognition function configured to match acoustic signals to corresponding word sequences, based on the language model parameters;
evaluate a reference acoustic signal to determine a reference word sequence corresponding to the reference acoustic signal and language model parameters for matching the reference word sequence to the reference acoustic signal;
generate competing word sequences by replacing segments of the reference word segment with competing segments and determining language model parameters for matching the competing word sequences to the reference acoustic signal; and
revise the language model parameters to increase the parameters that preferentially match the reference word sequences to the reference acoustic signal, and decrease the parameters that preferentially match the competing word sequences to the reference acoustic signal.

20. A non-transitory computer readable medium comprising instructions that are readable and executable by a computing system, wherein the instructions configure the computing system to perform automatic speech recognition on spoken language inputs, comprising configuring the computing system to:
receive a speech input;
match the speech input to a word sequence corresponding to the speech input by applying an automatic speech recognition tool to the speech input, wherein the automatic speech recognition tool selects for the highest joint association score between the speech input and a word sequence; and
provide user-perceptible output based on the word sequence matched to the speech input;
wherein the joint association score comprises parameters of a language model that have been iteratively trained to reduce a total loss function indicative of a rate of error in classifying speech inputs with word sequences, wherein the iterative training incorporates comparing the joint association scores of reference word sequences with competing word sequences identical to the reference word sequences except for having one acoustic segment at a time replaced by a competing acoustic segment.

* * * * *